United States Patent [19]

Steffen et al.

[11] Patent Number: 4,932,821
[45] Date of Patent: Jun. 12, 1990

[54] NAIL RETAINING STRIP

[75] Inventors: Markus Steffen, Grabs; Peter von Flue, Degersheim, both of Switzerland

[73] Assignee: Hilti Aktiengesellschaft, Fürstentum Liechtenstein

[21] Appl. No.: 344,434

[22] Filed: Apr. 26, 1989

Related U.S. Application Data

[63] Continuation of Ser. No. 20,551, Mar. 2, 1987, abandoned.

[30] Foreign Application Priority Data

Mar. 3, 1986 [DE] Fed. Rep. of Germany ....... 3606901

[51] Int. Cl.⁵ .............................................. F16B 15/08
[52] U.S. Cl. .................................. 411/442; 411/441; 411/443; 206/347
[58] Field of Search ............... 411/440, 441, 442, 443, 411/444; 206/347, 346, 341, 330, 343

[56] References Cited

U.S. PATENT DOCUMENTS

| | | | |
|---|---|---|---|
| 2,784,405 | 3/1957 | Working, Jr. | 206/347 X |
| 3,490,329 | 1/1970 | Pratorius | 411/441 |
| 3,491,933 | 1/1970 | Thurner et al. | 411/441 |
| 3,904,032 | 9/1975 | Maier | 411/442 X |
| 3,944,068 | 3/1976 | Maier et al. | 411/442 X |
| 3,955,674 | 5/1976 | Maier et al. | 411/440 X |
| 4,106,618 | 8/1978 | Haytayan | 206/347 X |
| 4,586,607 | 5/9186 | Dubbs et al. | 206/346 X |
| 4,606,455 | 8/1986 | Griskis et al. | 206/347 |

FOREIGN PATENT DOCUMENTS

| | | |
|---|---|---|
| 1957930 | 11/1969 | Fed. Rep. of Germany ...... 411/444 |
| 1603978 | 1/1971 | Fed. Rep. of Germany . |
| 7032234 | 5/1972 | Fed. Rep. of Germany . |
| 2810069 | 9/1978 | Fed. Rep. of Germany . |
| 3312674 | 10/1983 | Fed. Rep. of Germany . |
| 2335722 | 7/1977 | France . |
| 1080538 | 8/1967 | United Kingdom . |

Primary Examiner—Gary L. Smith
Assistant Examiner—F. Saether
Attorney, Agent, or Firm—Toren, McGeady & Associates

[57] ABSTRACT

A nail retaining strip for feeding nails into a fastening element driving tool where the nails are driven individually out of the tool by a drive piston includes guide bushings for the nails. Adjacent guide bushings are separably interconnected by connecting webs. The guide bushing extends in the axial direction of the nail shank and has axially and circumferentially extending circular guide surfaces for supporting the nails within the muzzle bore of the driving tool. The connecting webs extend radially outwardly from the guide surfaces so that the guide surfaces on adjacent guide bushings are in spaced relation. The connecting webs retain the nails in the axial direction of the muzzle bore by engagement in a receiving recess in the bore located opposite a passage through which the nails are inserted into the bore. Such axial retention permits complete utilization of the nail strip down to and including the last nail.

3 Claims, 1 Drawing Sheet

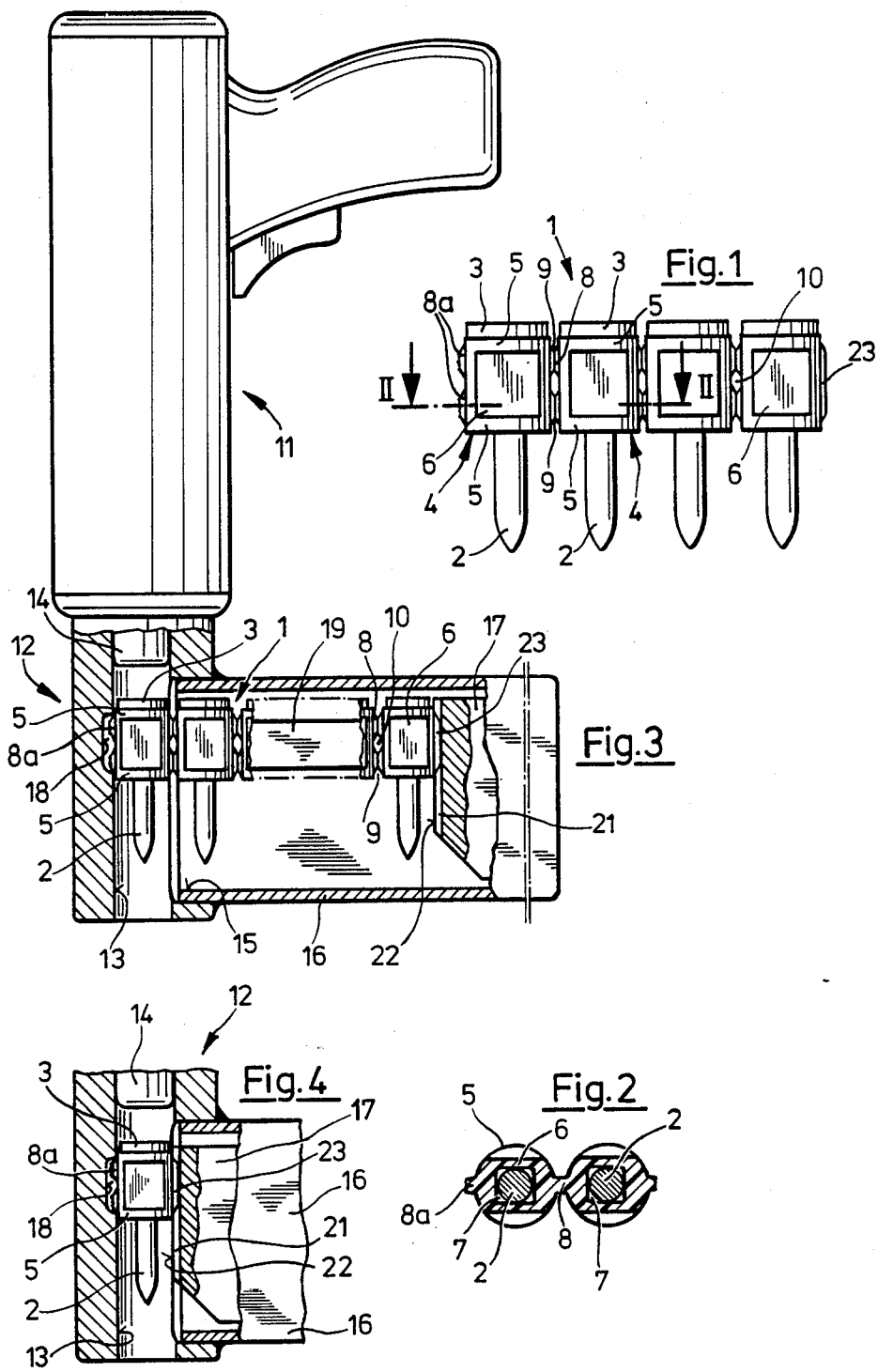

NAIL RETAINING STRIP

This is a continuation of Ser. No. 7/020,551, filed Mar. 2, 1987 now abandoned.

BACKGROUND OF THE INVENTION

The present invention is directed to a nail retaining strip or nail strip with nails arranged in parallel relation and held together by severable connecting means. Such a nail strip is used in a fastening element driving tool using a piston for driving the nails out of a muzzle bore in the tool. The muzzle part of the tool has a passage for inserting the nails one at a time into the bore. On the opposite side of the bore from the passage a recess extending radially outwardly and in the axial direction is arranged to receive a portion of the connecting means.

Nail strips are used in piston type driving tools and have considerable advantages over feeding devices for supplying individual nails, not connected together, into the tools. The use of nail strips permits an automatic feed and rapid nail placement cycles along with avoidance of the loss of nails.

In DE-OS No. 28 10 069 a known nail strip is disclosed where the nails formed of a head and a shank are formed in one piece out of metal plates with the heads of adjacent nails held together by severable connecting means. The connecting means are in the form of narrow metal strips projecting from the nail heads and the strips are severed in the center between the heads when the piston drives the nail out of the tool. The individual nails are driven by the piston from the muzzle bore into a receiving material.

It is the purpose of the connecting means not only to hold the nails together in a strip form but also to insure the parallel alignment of the nail shanks relative to one another. Such parallel alignment of the nail shanks is difficult to maintain, because it is easy for the connecting means to become bent. Moreover, a complete utilization of the nail strip is impossible since at least the last nail to be driven from the strip arrives in the muzzle bore without any defined guided position. As a result, the last few nails in the strip cannot be used since the remaining portion of the strip cannot provide adequate guidance in the radial passage into the muzzle bore of the driving tool.

When an adjacent nail has been driven from the known strip, a half portion of the connecting means remains and projects from the nail positioned within the muzzle bore. To afford adequate axial support during the severing process the half portion of the connecting means extends into a receiving opening formed in the wall of the muzzle bore opposite the passage through which the nail is introduced into the bore.

SUMMARY OF THE INVENTION

It is the primary object of the present invention to form a nail strip affording reliable axial guidance of a nail in the muzzle bore of a driving tool and assuring a complete utilization of all the nails in the nail strip within the driving tool.

In accordance with the present invention, within the nail strip, the nails are retained in guide bushings with circular guide surfaces extending in the axial direction of the nails. Adjacent guide bushings are connected by connecting means which extend in the axial direction of the nails and extend radially outwardly from the guide surfaces.

The circular guide surfaces on the guide bushings correspond to the cross-sectional shape of the muzzle bore, so that an accurate guidance of the nails parallel to the axial direction of the bore in the driving tool is assured. Appropriately, the guide surfaces are located at the ends of the guide bushings, whereby any possible deviating forces produce only small transverse stresses in the guide surfaces.

When the piston is driven forwardly through the driving tool against the nail in the muzzle bore the connecting means to the next nail in the strip to be inserted into the muzzle bore are severed. The connecting means extend between the circular guide surfaces located at the opposite ends of the bushings. When a nail is inserted into the muzzle bore a portion of the connecting means remains on the side of the guide bushing leading in the insertion direction into the bore. Because of its axially extending characteristic, the remaining portion of the connecting means extends in the feed direction of the nail strip outwardly from the guide surfaces and enters into the receiving opening in the surface of the bore on the opposite side of the muzzle part from the passage through which the nail enters the bore. Due to this arrangement, the last nail in the nail strip can be aligned in its axial direction with the axis of the muzzle bore affording a positive locking of the nail in position. The nail is retained in the axial direction within the muzzle bore due to the remaining portion of the connecting means extending into the receiving opening or recess. This retained position of the nail is overcome only when the piston impacts against the nail head causing the destruction of the remaining connection means located within the receiving recess. The guide bushings and the connecting means are appropriately molded as a single unit from a plastics material.

Preferably, the connecting means are formed as webs extending for at least half of the axial length of the guide bushing. For favorable load distribution it is advantageous to locate the connecting webs centered in the axial length of the guide bushings. Such webs provide a high deformation stiffness, so that the shape of the nail strip is stable for maintaining the parallel arrangement of the nails relative to one another.

To assure that the webs are severed or separated in the center between the guide bushings the webs are provided with a centrally located reduced strength or weakened region between two adjacent guide bushings. The reduced strength section is formed by providing at least one V-shaped recess at one of the opposite end faces of the web spaced apart in the axial direction of the nails. The cross-sectional reduced strength afforded by the V-shaped recesses located at both of the end faces of the webs also reduces the force required to sever the webs. After the webs are severed, the V-shaped recesses at the ends of the webs form bevels which facilitate the radial movement of the severed webs into the receiving recesses formed in the surface of the muzzle bore.

Effective guidance of the guide bushings within the muzzle bore along with a saving in material is attained in accordance with a further feature of the invention where the guide surfaces are formed by annular surfaces located at the opposite ends of the guide bushing in the axial direction of the nails with the annular guide surfaces having a height or axial dimension corresponding to 0.1 to 0.3 times the diameter of the annular surfaces. The annular surfaces are spaced apart by an axially extending section which is considerably reduced in thickness as compared to the annular guide surfaces thereby providing a saving in material. Preferably, the connecting webs extend between the axial section located between the annular guide surfaces.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

FIG. 1 is an elevational view of a portion of a nail strip embodying the present invention;

FIG. 2 is a transverse section taken along the line II—II in FIG. 1;

FIG. 3 illustrates a smaller nail strip as compared to that shown in FIG. 1 with the strip located within a driving tool with a portion of the tool illustrated in section; and FIG. 4 is a partial view, similar to that shown in FIG. 3, showing the last nail of the nail strip within the muzzle bore of driving tool.

DETAILED DESCRIPTION OF THE INVENTION

In FIG. 1 a portion of a nail strip 1 is displayed formed of a plurality of nails arranged parallel to one another with each nail having a head at one end and an axially extending shank extending from the head. At the head end of each shank 2 there is a guide bushing 4 formed of a plastics material. Annular surfaces 5 which act as guide surfaces are provided at the opposite ends of each bushing 4 spaced apart in the axial direction of the nails. The annular guidance surfaces 5 project radially outwardly beyond the outer circumference of the head. Extending between the annular surfaces is a reduced cross-section part 6. This can be seen in FIG. 2, the cross-section of the parts 6 is less than that of the annular surfaces 5. Each guide bushing has a rectangularly shaped central bore 7 in which the shank 2 of the nail is secured.

Adjacent guide bushings 4 in the nail strip 1 are connected together by connecting means in the form of a web 8 formed of the same plastics material as in the part 6 so that the guide bushings for the strip are constructed as a unit. As can be seen in FIGS. 1 and 3, the opposite ends of the webs spaced apart in the axial direction of the nails have V-shaped recesses 9 extending into the webs and forming a reduced strength cross-section. In addition, openings 10 are formed through the webs centered between the V-shaped recesses 9 for purposes of fabrication.

A fastening element driving tool 11 is shown in FIG. 3 with a downwardly extended muzzle part 12. Piston 14 is shown extending into the muzzle bore 13 from the upper part of the tool housing. The driving direction is the downward direction as viewed in FIG. 3 with the piston moving through the muzzle bore against the nail head 3 and driving the nail out of the muzzle bore 13 into a receiving material. The muzzle has an opening arranged to receive a channel 15 extending radially relative to the muzzle bore formed by a hollow member or magazine 16. Slide 17 actuated by a spring force is located within the magazine 16 and feeds the individual nails of the nail strip 1 radially into the muzzle bore 13.

As each nail is inserted into the muzzle bore, it aligns itself coaxially with the muzzle bore 13 due to the arrangement of the annular guiding surfaces 5 on the guide bushing 4 which are supported against the muzzle bore wall. When the preceeding nail was driven from the driving tool, the web connecting it to the following nail was severed, an axially extending portion 8a of the web remained projecting radially outwardly from the guide bushing. As a result, when the next nail is fed into the muzzle bore 13 the portion 8a extending radially outwardly from the annular surfaces 5 enters into an axially extending receiving recess 18 in the wall of the muzzle bore. The receiving recess 18 is limited in its axial length for retaining the web portion 8a. Accordingly, the nail, located in the muzzle bore 13, is held in position ready to be driven due to the engagement of the web portion 8a within the recess 18 and also due to the connection of the remaining unsevered portion 8 of the web with the remaining nail strip 1, that is, attached to the following nail in the nail strip. A guide strip 19 located between the annular guiding surfaces 5 extends into the reduced cross-section part 6 of the guide bushing 4. Guide strip 19 serves as a counterbearing for absorbing the forces developed when the web 8 is severed.

In FIG. 4 the last nail of the nail strip is shown inserted into the muzzle bore 13 ready to be driven by the piston 14. This last nail is retained in part in the axial direction by the engagement of the web portion 8a into the receiving recess 18 in the muzzle bore 13. On the diametrically opposite side of the nail from the receiving recess, a open ended recess 21 is located in the end face 22 of the slide 17 and receives a projecting part 23 on the guide bushing 4 on the last nail similar to the severed web portion 8a, so that the recess 21 in end face 22 of the slide leading in the feed direction of the nail strip into the driving tool, supports the bushing 4 in the axially extending region of the magazine to assure proper guidance as the piston 14 starts to drive the last nail in the strip from the muzzle bore 23. By engaging the web portion 8a on one side of the guide portion in the receiving recess 18 and the projection 23 on the opposite side in the recess 21 twisting or displacement of the nail within the muzzle bore is prevented. When a nail is being driven out of the muzzle bore by the piston 14, the guide bushing located on the nail shank 2 contacts the surface of the receiving material and is destroyed or displaced from the shank by the axial force of the nail head 3 driven by the piston.

While specific embodiments of the invention have been shown and described in detail to illustrate the application of the inventive principles, it will be understood that the invention may be embodied otherwise without departing from such principles.

We claim:

1. A nail strip for holding a plurality of nails together in spaced apart parallel relation for use in a fastening element driving tool using a piston for driving the nails from an axially extending bore in a muzzle part of the tool, each said nail comprises an axially extending shank and a head at one end of said shank projecting laterally outwardly from said shank and having a circumferentially extending lateral surface, and said nail strip comprises severable connecting means securing the nails together so that an individual nail can be separated from said nail strip when the individual nail is driven by the piston from the muzzle bore, individual said nails in the nail strip are arranged to be inserted into the bore into position to be driven by the piston, wherein the improvement comprises that said nail strip includes a plurality of guide bushings each positioned on the shank of a different one of said individual nails, each said guide bushing extending in the axial direction of the nail shank and having two circumferentially and axially extending circularly continuous annular guide surfaces projecting laterally outwardly from the nail shank at least to the lateral surface of the head of said nail secured by said guide bushing, said two guide surfaces on each said guide bushing being spaced apart in the axial direction of the nail shank and located at the axially spaced opposite ends of said guide bushing, said guide surfaces being shaped to conform in sliding relation with the muzzle bore, each said guide bushing between the axially spaced guide surfaces being inset relative to said guide surfaces transversely of the axial direction of said bushing so that the axial length between said guide surfaces has a reduced transverse cross section relative to the corresponding cross sections of said guide surfaces, adjacent said guide bushings being spaced apart transversely of the axial direction of said shanks and being interconnected by said connecting means, and said connecting means projecting radially outwardly beyond said circularly continuous annular guide surfaces and spacing apart said annular guide surfaces on said adjacent guide bushings whereby the heads of the nails are in spaced apart relation, said connecting means comprises a web integral with said guide bushings and extending in the axial direction of the nail shank for at least half of the corresponding axial length of said guide bushings, said annular guide surfaces have a dimension in the axial direction of the nail shank corresponding to 0.1 to 0.3 times the diameter of said annular guide surfaces, and each said web has a reduced strength section spaced between adjacent said guide bushings and said reduced strength section being formed by a V-shaped recess formed into at least one end of said web extending transversely of the axial direction of the nail shank.

2. A nail strip, as set forth in claim 1, wherein said bushings have a section extending between said annular guide surfaces with at least a portion of said section spaced radially inwardly from the circumferential surface of said annular guide surfaces and said section forming a rectangular bore for holding the nail shank.

3. A nail strip, as set forth in claim 2, wherein said section of said guide bushing extending between said annular guide surfaces has exterior planar surfaces extending in parallel relation and arranged to guide the nail strip into the muzzle bore.

* * * * *